United States Patent
Chiba et al.

(10) Patent No.: US 9,449,735 B2
(45) Date of Patent: *Sep. 20, 2016

(54) MOLDED ARTICLE OF POLYOLEFIN-BASED RESIN EXPANDED BEADS

(71) Applicant: JSP CORPORATION, Tokyo (JP)

(72) Inventors: Takuya Chiba, Yokkaichi (JP);
Masaharu Oikawa, Yokkaichi (JP);
Mitsuru Shinohara, Yokkaichi (JP)

(73) Assignee: JSP CORPORATION, Tokyo (JP)

(*) Notice: Subject to any disclaimer, the term of this patent is extended or adjusted under 35 U.S.C. 154(b) by 284 days.

This patent is subject to a terminal disclaimer.

(21) Appl. No.: 14/047,584

(22) Filed: Oct. 7, 2013

(65) Prior Publication Data
US 2014/0097389 A1 Apr. 10, 2014

(30) Foreign Application Priority Data
Oct. 10, 2012 (JP) ................... 2012-225005

(51) Int. Cl.
| | |
|---|---|
| *H01B 1/06* | (2006.01) |
| *H01B 1/24* | (2006.01) |
| *C08J 9/00* | (2006.01) |
| *C08J 9/12* | (2006.01) |

(Continued)

(52) U.S. Cl.
CPC ................ *H01B 1/24* (2013.01); *C08J 9/008* (2013.01); *C08J 9/0061* (2013.01); *C08J 9/122* (2013.01); *C08J 9/18* (2013.01); *C08J 9/232* (2013.01); *C08J 9/34* (2013.01); *C08J 2201/034* (2013.01); *C08J 2203/06* (2013.01); *C08J 2205/052* (2013.01); *C08J 2323/10* (2013.01); *C08J 2423/04* (2013.01); *C08J 2453/00* (2013.01)

(58) Field of Classification Search
CPC .................. B29C 44/445; B29C 2049/4667; C08J 2201/034; C08J 9/0061; C08J 9/224; C08J 9/232
USPC .................. 252/511; 264/42, 45.9; 427/212; 428/336; 521/66
See application file for complete search history.

(56) References Cited

U.S. PATENT DOCUMENTS 9,230,710 B2 * 1/2016 Chiba .................. C08J 9/224
2009/0169895 A1 7/2009 Nohara et al.

FOREIGN PATENT DOCUMENTS

| EP | 1 055 700 A1 | 11/2000 |
|---|---|---|
| JP | S41-16125 B | 9/1966 |

(Continued)

OTHER PUBLICATIONS

European Search Report dated Feb. 25, 2014, for EP 13004554.

(Continued)

*Primary Examiner* — Khanh Tuan Nguyen
(74) *Attorney, Agent, or Firm* — Bacon & Thomas, PLLC (57) ABSTRACT

An electrostatic dissipating molded article having a surface resistivity of $1 \times 10^5$ to $1 \times 10^{10} \Omega$ and obtained by in-mold molding of multi-layered polyolefin-based resin expanded beads each having an polyolefin-based resin expanded core layer and a polyolefin-based resin cover layer which covers the polyolefin-based resin expanded core layer and which is formed from a polyolefin-based resin (A), a polymeric antistatic agent (B) of a block copolymer of a polyether block and a polyolefin block, and an electrically conductive carbon black (C), the components (A) to (C) being present in a specific proportion.

6 Claims, 1 Drawing Sheet

(51) Int. Cl.
*C08J 9/18* (2006.01)
*C08J 9/232* (2006.01)
*C08J 9/34* (2006.01)

(56) References Cited

FOREIGN PATENT DOCUMENTS

| JP | S43-23858 B | 10/1968 |
| JP | S44-29522 B | 12/1969 |
| JP | 60-185816 A | 9/1985 |
| JP | H07-304895 A | 11/1995 |
| JP | H09-202837 A | 8/1997 |
| JP | H10-251436 A | 9/1998 |
| JP | 2000-169619 A | 6/2000 |
| JP | 2001-151928 A | 6/2001 |
| JP | 2006-232939 A | 9/2006 |
| JP | 2002003634 A | 1/2009 |
| JP | 2009-173021 A | 8/2009 |

OTHER PUBLICATIONS

AN 2002-540862 (XP002720833), WPI/Thomson (cited in EP Search Report).

* cited by examiner

MOLDED ARTICLE OF POLYOLEFIN-BASED RESIN EXPANDED BEADS

BACKGROUND OF THE INVENTION

1. Technical Field

The present invention relates to a molded article of polyolefin-based resin expanded beads, and, more particularly, to a molded article of polyolefin-based resin expanded beads which has electrostatic dissipating properties.

2. Related Art

Polyolefin-based resins, such as polypropylene-based resins and polyethylene-based resins, are well-balanced in terms of mechanical strength and heat resistance. Molded articles produced by in-mold molding of expanded beads composed primarily of such a polyolefin-based resin not only have excellent properties inherent in the polyolefin-based resin but also are excellent in shock-absorbing properties and show good recovery from compressive strain. Such molded articles are therefore used in a wide variety of applications including packaging materials for electric and electronic components and shock-absorbing materials for automobiles.

However, because polyolefin-based resins, such as polypropylene-based resins, are materials with a high electrical resistance, molded articles of expanded beads composed primarily of a polyolefin-based resin are electrically chargeable. Thus, expanded beads-molded articles to which antistatic performance or conductive performance has been imparted are used as the packaging materials for electronic components and so on which must be kept away from static electricity.

In addition, the improvement in performance of electronic components, such as integrated circuits and hard disks in recent years has created a demand for a packaging material formed from an electrostatically dissipative material having a surface resistivity of $1 \times 10^5$ to $1 \times 10^{10} \Omega$ to prevent the electronic components from being damaged by static electricity. However, a polyolefin-based resin expanded beads molded article having a surface resistivity of $1 \times 10^5$ to $1 \times 10^{10} \Omega$ has not been able to be produced stably by a conventional antistatic or conductivity-imparting treatment technology.

For example, as methods for imparting antistatic performance to a polyolefin-based resin expanded beads molded article, Japanese Unexamined Patent Publication JP-A-H07-304895 discloses a method for producing a polypropylene-based resin expanded beads molded article by in-mold molding of antistatic expanded beads obtained by expanding resin particles containing a surfactant, and JP-A-2009-173021 discloses a method for producing a polyolefin-based resin expanded beads molded article by in-mold molding of expanded beads obtained by expanding resin particles covered with a resin layer containing a polymeric antistatic agent.

These methods are effective in producing an expanded beads molded article having a surface resistivity higher than $1 \times 10^{10} \Omega$. However, it is difficult to achieve a surface resistivity of not higher than $1 \times 10^{10} \Omega$ with a method which uses a proper amount of an antistatic agent as described above because of the limitations of the electrical characteristics of the antistatic agent itself. Namely, when a large amount of an antistatic agent is added for the purpose of achieving a surface resistivity of below $1 \times 10^{10} \Omega$, the expandability and fusion bonding capability of the resulting expanded beads are considerably deteriorated.

As a further method for imparting electrical conductivity to a polyolefin-based resin expanded beads molded article, JP-A-H09-202837, JP-A-H10-251436 and JP-A-2000-169619 disclose a method in which an electrically conductive inorganic substance, such as an electrically conductive carbon black or metal powder, is added to the base resin of polypropylene-based resin expanded beads to create an electrically conductive network of an electrically conductive inorganic substance in the base resin. In addition, a method for producing an expanded beads molded article by in-mold molding of electrically conductive expanded beads obtained by expanding polypropylene-based resin particles covered with a resin layer containing an electrically conductive carbon black is disclosed in JP-A-2006-232939. These methods allow an electrically conductive molded article of polypropylene-based resin expanded beads having a surface resistivity of lower than $1 \times 10^5 \Omega$ to be easily produced.

SUMMARY OF THE INVENTION

In order to obtain a polyolefin-based resin expanded beads molded article having a surface resistivity of $1 \times 10^5$ to $1 \times 10^{10} \Omega$ by a method using an electrically conductive inorganic substance, a thought may occur to reduce the content of the electrically conductive inorganic substance. However, when the content of electrically conductive inorganic substance is reduced beyond a certain level (percolation threshold), a so-called percolation phenomenon by which the surface resistivity shows a sharp discontinuous change, occurs. It is, therefore, difficult to achieve a surface resistivity in the range of $1 \times 10^5$ to $1 \times 10^{10} \Omega$ stably.

In particular, the surface resistivity of conventional polyolefin-based resin expanded beads molded articles, such as molded articles polypropylene-based resin expanded beads molded articles, containing an electrically conductive inorganic substance show a drastic discontinuous change when the content of electrically conductive inorganic substance in the molded articles is close to the percolation threshold. One possible reason for this is that at least two expansion steps, namely primary expansion of resin particles into expanded beads and secondary expansion of the expanded beads during in-mold molding, are necessary to obtain an expanded beads-molded article. Namely, the surface resistivity of the molded article is largely affected by and varies depending on the distance between the electrically conductive carbon black particles contained therein. However, the distance between the electrically conductive carbon black particles in the polyolefin-based resin is difficult to control during the two-stage expansion process. It is considered that, for this reason, achievement of a surface resistivity of $1 \times 10^5$ to $1 \times 10^{10} \Omega$ in a stable manner is difficult. In particular, it is highly difficult to achieve a desired surface resistivity when an expanded beads-molded article having a high expansion ratio (a low apparent density) is to be produced.

Another problem involved in the above conventional molded articles is that even a slight non-uniformity of dispersion of the electrically conductive inorganic substance results in a significant variation in the surface resistivity of the expanded beads-molded article. Thus, even when the expanded beads-molded article has an average surface resistivity that meets desired performance requirements as a whole, some portions of the molded article may have a surface resistivity outside the desired range.

It is, therefore, an object of the present invention to provide a molded article of polyolefin-based resin expanded beads which has a high expansion ratio and good adhesion strength between the expanded beads which can maintain the excellent properties inherent to the polyolefin-based resins and which has a surface resistivity in the range of $1\times10^5$ to $1\times10^{10}\Omega$ and, therefore, exhibits stable electrostatic dissipating properties.

In accordance with one aspect of the present invention, there is provided a polyolefin-based resin expanded beads molded article obtained by in-mold molding of multi-layered polyolefin-based resin expanded beads each having an polyolefin-based resin expanded core layer and a polyolefin-based resin cover layer covering the polyolefin-based resin expanded core layer, wherein the polyolefin-based resin cover layer comprising a mixture of a polyolefin-based resin (A), a polymeric antistatic agent (B) which is a block copolymer of a polyether block and a polyolefin block, and an electrically conductive carbon black (C), wherein a weight ratio (A:B) of the polyolefin-based resin (A) to the polymeric antistatic agent (B) is 99.5:0.5 to 55:45, and the electrically conductive carbon black (C) is present in an amount of 5 to 30 parts by weight per 100 parts by weight of the total of the polyolefin-based resin (A) and the polymeric antistatic agent (B), and wherein the polyolefin-based resin expanded beads molded article has a surface resistivity of $1\times10^5$ to $1\times10^{10}\Omega$.

In a second aspect, the present invention provides the polyolefin-based resin expanded beads molded article according to the first aspect, wherein both of the polyolefin-based resin of the polyolefin-based resin expanded core layer and the polyolefin-based resin of the polyolefin-based resin cover layer are a polypropylene-based resin. In a third aspect the present invention provides the polyolefin-based resin expanded beads molded article according to the first or second aspect, wherein the electrically conductive carbon black (C) is Ketjen black and present in an amount of 5 to 15 parts by weight per 100 parts by weight of the total of the polyolefin-based resin (A) and the polymeric antistatic agent (B). In a fourth aspect, the present invention provides the polyolefin-based resin expanded beads molded article according to any one of the first to third aspects, wherein a weight ratio of the polyolefin-based resin expanded core layer to the polyolefin-based resin cover layer is 99.5:0.5 to 65:35. In a fifth aspect, the present invention provides the polyolefin-based resin expanded beads molded article according to any one of the first to fourth aspects, wherein the polyolefin-based resin expanded beads molded article has an apparent density of 10 to 90 kg/m³. In a sixth aspect, the present invention provides the polyolefin-based resin expanded beads molded article according to any one of the first to fifth aspects, wherein the polyolefin-based resin expanded beads molded article has a 50% compressive stress of Cs [kPa] and an apparent density of Ad [kg/m³] and, wherein a ratio Cs/Ad is 6 or higher.

The polyolefin-based resin expanded beads molded article according to the present invention is formed from multi-layered polyolefin-based resin expanded beads obtained by expanding multi-layered resin particles each having a polyolefin-based resin core layer covered with a polyolefin-based resin outer layer containing an electrically conductive carbon black and a polymeric antistatic agent. Thus, the molded article has a surface resistivity of $1\times10^5$ to $1\times10^{10}\Omega$ and exhibits stable electrostatic dissipation properties.

In addition, the electrical resistance of the molded article according to the present invention is hardly affected by its apparent density. Thus, as compared with a conventional molded article containing electrically conductive inorganic substance, the surface resistivity of the molded article of the present invention is less influenced by the molding conditions or the mold design. Therefore, the molded article of the present invention exhibits stable electrostatic dissipating properties even when formed in a complex shape.

BRIEF DESCRIPTION OF THE DRAWINGS

Other objects, features and advantages of the present invention will become apparent from the detailed description of the preferred embodiments of the invention, which follows when considered in light of the accompanying drawing, in which.

DETAILED DESCRIPTION OF THE
PREFERRED EMBODIMENT OF THE
INVENTION

Description is hereinafter made of a molded article of polyolefin-based resin expanded beads (hereinafter occasionally referred to simply as "expanded beads-molded article" or "molded article") according to the present invention in detail.

The expanded beads-molded article is produced by in-mold molding of multi-layered polyolefin-based resin expanded beads having a specific multi-layer structure in which a polyolefin-based resin expanded core layer (hereinafter occasionally referred to simply as "expanded core layer") is covered with a polyolefin-based resin cover layer (hereinafter occasionally referred to simply as "cover layer").

The multi-layered polyolefin-based resin expanded beads (hereinafter occasionally referred to as "multi-layered expanded beads" or simply as "expanded beads") are obtained by expanding multi-layered resin particles each having a polyolefin-based resin core layer (hereinafter occasionally referred to simply as "resin particle core layer") covered with a polyolefin-based resin outer layer (hereinafter occasionally referred to simply as "resin particle outer layer"), and have a specific multi-layer structure in which the expanded core layer in an expanded state is covered with the cover layer.

The cover layer of the expanded beads contains a mixture of a polyolefin-based resin (A), a polymeric antistatic agent (B) and an electrically conductive carbon black (C), wherein the weight ratio (A:B) of the polyolefin-based resin (A) to the polymeric antistatic agent (B) and the content of the electrically conductive carbon black (C) in the cover layer are each in a specific range so that the expanded beads-molded article obtained by in-mold molding of the expanded beads has a surface resistivity of $1\times10^5$ to $1\times10^{10}\Omega$ and therefore exhibits stable electrostatic dissipating properties.

Because the multi-layered resin particles are expanded into the expanded beads as described above, the resin particle core layer turns into the expanded core layer and the resin particle outer layer turns into the cover layer. Thus, the base resin of the cover layer is the same as the base resin of the resin particle outer layer. Also, the polyolefin-based resin of the expanded core layer is the same as the polyolefin-based resin of the resin particle core layer.

The cover layer of the expanded beads of the present invention is next described. The cover layer may be in an expanded or unexpanded state, but is preferably substantially unexpanded in order to obtain an expanded beads-molded article which exhibits stable electrostatic dissipating properties and a high degree of mechanical strength. The term "substantially unexpanded" used herein means that no cells are formed (including the case where cells once formed in an early stage of the expansion of the multi-layered resin particles are destroyed when the cover layer is melted in a later stage), but does not exclude the presence of microcells to the extent that the mechanical strength of the resulting expanded beads molded article is not affected.

The expanded core layer of each expanded bead may be completely covered with the cover layer or may be partially exposed. For example, when the expanded core layer has the shape of a cylinder, only the peripheral surface of the cylinder may be covered with the cover layer with the expanded core layer being exposed at the top and bottom of the cylinder.

The resin particle outer layer contains a mixture of a polyolefin-based resin (A), a polymeric antistatic agent (B) and an electrically conductive carbon black (C). The composition and the method for the synthesis of the polyolefin-based resin (A) are not specifically limited as long as the polyolefin-based resin (A) contains an olefin component as a major component. Preferably, the polyolefin-based resin (A) contains 50% by weight or more, more preferably 70% by weight or more, still more preferably 90% by weight or more, of an olefin component. Examples of the polyolefin-based resin include polypropylene-based resin, polyethylene-based resin, polybutene-based resin and mixtures thereof.

The term "polypropylene-based resin" used herein refers to a resin containing 50% by weight or more of a propylene component unit. Examples of the polypropylene-based resin include propylene homopolymers and copolymers of propylene with another olefin copolymerizable therewith. Examples of the olefin copolymerizable with propylene include ethylene and α-olefins having four or more carbon atoms, such as 1-butene. The copolymers may be random copolymers or block copolymers, and may be binary copolymers or ternary copolymers. These polypropylene-based resins may be used singly or in combination of two or more. Examples of the copolymers include propylene-ethylene random copolymer, propylene-ethylene block copolymer, propylene-ethylene-butene random copolymer, and mixtures of two or more thereof.

The term "polyethylene-based resin" used herein refers to a resin containing 50% by weight or more, preferably 70% by weight or more, more preferably 80% by weight or more, still more preferably 90% by weight or more, of an ethylene component unit. The use of an ethylene homopolymer or a copolymer of ethylene with an α-olefin having 4 to 6 carbon atoms is preferred. Examples of the polyethylene-based resin include high density polyethylene, medium density polyethylene, low density polyethylene, linear low density polyethylene, very low density polyethylene, ethylene-vinyl acetate copolymer, ethylene-acrylic acid copolymer, ethylene-alkyl acrylate copolymer, ethylene-methacrylic acid copolymer, ethylene-alkyl methacrylate copolymer, and mixtures of two or more thereof.

The polymeric antistatic agent (B) used in the present invention is a block copolymer of a polyether block and a polyolefin block. The polymeric antistatic agent (B) is preferably a block copolymer having a structure in which a polyether block, which is a hydrophilic block having a volume resistivity of $10^5$ to $10^{11}$ Ω·cm, and a polyolefin block are alternately linked, and preferably has a number average molecular weight (Mn) of 2,000 to 60,000.

The block copolymer preferably has a structure in which the polyolefin block and the hydrophilic resin block are alternately linked through at least one linkage selected from an ester linkage, an amide linkage, an ether linkage, an urethane linkage and an imide linkage. Specific examples of the polymeric antistatic agent include products available from Sanyo Chemical Industries, Ltd. under the trade names of "PELESTAT 230," "PELESTAT HC250," "PELECTRON PVH," "PELECTRON PVL" and "PELECTRON HS."

The polymeric antistatic agents listed above may be used singly or in combination of two or more.

The electrically conductive carbon black (C) used in the present invention preferably has a dibutyl phthalate (DBP) oil absorption amount of 150 to 700 ml/100 g, more preferably 200 to 600 ml/100 g, still more preferably 300 to 600 ml/100 g. Examples of the electrically conductive carbon black (C) include acetylene black, furnace black and channel black. The DBP oil absorption amount is measured according to ASTM D2414-79. These electrically conductive carbon blacks may be used singly or in combination of two or more. Among these, furnace black is preferred because it provides high electrical conductivity even when added in a small amount. Oil-furnace black is more preferred, and Ketjen black is still more preferred because a desired surface resistivity can be achieved with a small amount.

The expanded beads-molded article having a surface resistivity of $1\times10^5$ to $1\times10^{10}$Ω according to the present invention can be obtained by in-mold molding of expanded beads having a cover layer composed of a mixture containing the polyolefin-based resin (A), the polymeric antistatic agent (B) and the electrically conductive carbon black (C) at a specific ratio. The fact that a surface resistivity of $1\times10^5$ to $1\times10^{10}$Ω is attained when the components (B) and (C) are contained together in the cover layer of the polyolefin-based resin (A), is quite unexpected, because independent use of the components (B) and (C) fails to provide such a medium degree of surface resistivity.

Although not wishing to be bound by the theory, it is inferred that the mechanism by which a medium degree of surface resistivity in the range of $1\times10^5$ to $1\times10^{10}$Ω of the expanded beads molded article is generated is probably concerned with the formation of a specific electrically conductive network structure as described below.

In general, when an electrically conductive carbon black is dispersed in a polyolefin-based resin, such as a polypropylene-based resin, electrical conductivity is generated because of the formation of an electrically conductive network structure in which adjacent carbon black particles are proximately positioned relative to each other within a given distance. In the case of a foam material such as expanded beads, the constituent resin has been extended during the expansion. When a resin containing an electrically conductive carbon black is expanded, the distance between the electrically conductive carbon black particles increases as compared with that before the expansion. However, when a sufficient amount of electrically conductive carbon black is added, a large number of electrically conductive carbon black particles are present sufficiently close to each other to maintain the electrically conductive network structure. As a result, the resulting expanded beads molded article exhibits a sufficiently high electrical conductivity to provide a surface resistivity lower than $1\times10^4$Ω.

However, when the content of electrically conductive carbon black is reduced with a view toward achieving a medium degree of surface resistivity and obtaining electrostatic dissipating properties in the resulting expanded beads molded article, the distance between the electrically conductive carbon black particles increases. Therefore, the number of carbon black particles present within the given distance is too small to form an electrically conductive network. For this reason, the addition of a reduced amount of electrically conductive carbon black causes a so-called percolation phenomenon, in which the surface resistivity increases significantly.

On the other hand, the polymeric antistatic agent (B) itself has such a degree of electrical conductivity as to provide a surface resistivity of approximately $1 \times 10^6$ to $1 \times 10^{11} \Omega$. Thus, when mixed and kneaded with a thermoplastic resin, the polymeric antistatic agent (B) is dispersed and oriented to form a conductive network in the thermoplastic resin. In addition, because the polymeric antistatic agent (B) is further oriented with the growth of cells during expansion, an expanded beads molded article having a surface resistivity of approximately $1 \times 10^{10}$ to $1 \times 10^{14} \Omega$ can be obtained. However, even when a large amount of the polymeric antistatic agent (B) is added for the purpose of achieving a lower surface resistivity, a surface resistivity below $1 \times 10^{10} \Omega$ is difficult to achieve. On the contrary, the addition of a large amount of the polymeric antistatic agent may significantly impair the moldability and fusion bonding of the resulting expanded beads.

The expanded beads constituting the expanded beads molded article of the present invention are obtained by expanding multi-layered resin particles each having a resin particle core layer and a resin particle outer layer. It is believed that a sea-island structure in which dispersed phases of the polymeric antistatic agent (B) are dispersed in a continuous phase of the polyolefin-based resin (A) is formed in the cover layer and that the electrically conductive carbon black is unevenly distributed to the dispersed phases.

The formation of the sea-island structure is considered to play an important role in obtaining the desired electrostatic dissipating properties. Namely, in the cover layer of the expanded beads, the electrically conductive carbon black is contained in the dispersed phases of the polymeric antistatic agent (B) dispersed in the continuous phase of the polyolefin-based resin (A). The electrically conductive carbon black (C) in the dispersed phases forms an electrically conductive network structure. Because the electrically conductive carbon black particles are bound by the polymeric antistatic agent (B), the electrically conductive carbon black particles are restricted from moving. Therefore, the distance between the electrically conductive carbon black particles does not significantly increase even when the cover layer is extended during the expansion. Thus, the electrically conductive network structure formed by the electrically conductive carbon black (C) in the dispersed phases is maintained as such. As a consequence, the dispersed phases have such a low volume resistivity as to exhibit some degree of electrical conductivity.

In addition, the polymeric antistatic agent (B) of the present invention, which contains a polyolefin block in its molecular chain, has a moderate affinity with a polyolefin-based resin, such as a polypropylene-based resin, but is not completely compatible therewith. Thus, the polymeric antistatic agent (B) is not considered to be excessively finely dispersed in the continuous phase of the polyolefin-based resin (A). Further, the dispersed phases of the polymeric antistatic agent (B) are considered to moderately (not excessively) deform following the deformation of the continuous phase of the polyolefin-based resin (A) during the expansion. For this reason, the dispersed phases, which themselves show some degree of electrical conductivity, can maintain a distance between the dispersed phases which distance is necessary to ensure the desired electrostatic dissipating properties.

By in-mold molding of the expanded beads each having a cover layer which has a continuous phase of the polyolefin-based resin (A) and dispersed phases of the polymeric antistatic agent (B) containing a conductive network structure of the carbon black (C), an expanded beads molded article which has good adhesion strength between the expanded beads and which has a surface resistivity of $1 \times 10^5$ to $1 \times 10^{10} \Omega$ and therefore exhibits electrostatic dissipating properties can be obtained. In addition, the fact that the sea-island structure is created only in the cover layer is another reason why the expanded beads molded article exhibits stable electrostatic dissipating properties independently from the apparent density (expansion ratio) of the expanded core layer, in other words, even when the expansion ratio is changed.

In the present invention, the weight ratio (A:B) of the polyolefin-based resin (A) to the polymeric antistatic agent (B) is 99.5:0.5 to 55:45. When the content of the polymeric antistatic agent (B) is too low, a desired surface resistivity cannot be achieved stably probably because a significant amount of electrically conductive carbon black can be present outside the dispersed phases of the polymeric antistatic agent (B) or the distance between the dispersed phases of the polymeric antistatic agent (B) becomes excessively large. On the other hand, a desired surface resistivity cannot be achieved stably either when the content of the polymeric antistatic agent (B) is too large probably because the polymeric antistatic agent (B) is less likely to form dispersed phases or the distance between the dispersed phases becomes excessively small. From this point of view, the mixing ratio, by weight, of the polypropylene-based resin (A) to the polymeric antistatic agent (B) is preferably 99.5:0.5 to 60:40, more preferably 99.5:0.5 to 65:35, still more preferably 99:1 to 70:30, especially preferably 99:1 to 75:25.

The using amount of the electrically conductive carbon black (C) is 5 to 30 parts by weight per 100 parts by weight of the total of the polyolefin-based resin (A) and the polymeric antistatic agent (B). When the content of the electrically conductive carbon black (C) is outside this range, a desired surface resistivity cannot be achieved stably. In order to achieve a medium degree of surface resistivity in the range of $1 \times 10^5$ to $1 \times 10^{10} \Omega$ more stably, Ketjen black is preferably used as the electrically conductive carbon black (C) because a desired surface resistivity can be achieved with the use of a small amount thereof as described above. The using amount of the electrically conductive carbon black (C) is preferably 5 to 15 parts by weight, more preferably 6 to 14 parts by weight, still more preferably 7 to 13 parts by weight, especially preferably 8 to 12 parts by weight, per 100 parts by weight of the total of the polyolefin-based resin (A) and the polymeric antistatic agent (B). When the electrically conductive carbon black (C) is acetylene black, the amount thereof is preferably 23 to 27 parts by weight, more preferably 24 to 26 parts by weight per 100 parts by weight of the total of the polypropylene-based resin (A) and the polymeric antistatic agent (B).

The electrically conductive carbon black (C) generally has an average particle size of 0.01 to 100 μm. For reason of easiness in achieving a surface resistivity of $1 \times 10^5$ to $1 \times 10^{10} \Omega$, the average particle size is preferably 10 to 80 nm, more preferably 15 to 60 nm.

The average particle size of the electrically conductive carbon black (C) is measured using an electron microscope. Specifically, an electron microscope photograph of the electrically conductive carbon black (C) is taken with several hundred particles contained in the field of view, and the diameters in a specific direction (Green diameters) of randomly selected 1,000 particles are measured. Then, a number-based cumulative distribution curve is created from the obtained values, and the 50% cumulative diameter in the number-based distribution is adopted as the average particle size.

The polyolefin-based resin (A) preferably has a melt flow rate (MFR) of 0.1 to 30 g/10 min, more preferably 2 to 20 g/10 min, still more preferably 3 to 15 g/10 min. The MFR of the polyolefin-based resin (A) is measured according to the test condition M of JIS K7210: 1999 (a temperature of 230° C. and a load of 2.16 kg).

The cover layer of the expanded beads may contain an additional thermoplastic resin or thermoplastic elastomer other than the polyolefin-based resin (A) and the polymeric antistatic agent (B) to the extent that the intended purpose is not impaired. Examples of such an additional thermoplastic resin include polystyrene-based resins such as polystyrene, impact-resistant polystyrene and styrene-acrylonitrile copolymer, acrylic-based resins such as methyl polymethacrylate, and polyester-based resins such as polylactic acid and polyethylene terephthalate. Examples of the thermoplastic elastomer include olefin-based elastomers such as ethylene-hexene copolymer, ethylene-octene copolymer and ethylene-propylene-diene copolymer, and styrene-based elastomers such as styrene-butadiene-styrene block copolymer, styrene-isoprene-styrene block copolymer, and hydrogenated products thereof.

In addition, the cover layer may further contain additives, such as a catalyst neutralizing agent, a lubricant and a crystal nucleating agent. However, the additives are preferably added in such an amount that the object of the present invention is not impaired and in as small an amount as possible. The using amount of the additives is preferably 15 parts by weight or less, more preferably 10 parts by weight or less, still more preferably 5 parts by weight or less, especially preferably 1 parts by weight or less, based on 100 parts by weight of the total of the polyolefin-based resin (A) and the polymeric antistatic agent (B) of the cover layer although it depends on the type and the purpose of use of the additives.

The polyolefin-based resin for the cover layer of the expanded beads preferably has a melting point which is lower than that of the polyolefin-based resin of the expanded core layer. In this case, when the expanded beads are heated to a temperature sufficiently high to cause secondary expansion of the expanded core layer during the in-mold molding, the cover layer is softened earlier than the expanded core layer and helps the expanded beads to be fusion bonded together. In addition, because the cell structure in the expanded core layer becomes less likely to be damaged during the in-mold molding, an expanded beads molded article which has excellent mechanical properties and does not undergo a significant shrinkage after molding can be obtained.

In addition, when the melting point of the polyolefin-based resin of the cover layer (which is formed from the resin particle outer layer) is lower than that of the polyolefin-based resin of the expanded core layer (which is formed from the resin particle core layer), the cover layer in a non-expanded state is obtained. One possible reason why the obtained cover layer is not in an expanded state is that, under the conditions under which the multi-layered resin particles are expanded, the expandability and/or viscoelasticity of the resin particle outer layer are not within the proper ranges so that the outer layer fails to expand or maintain the expanded state. In addition, the lower melting point of the cover layer is considered to facilitate smooth extension of the cover layer during the expansion so that the electrostatic dissipating properties thereof can be developed in a stable manner.

From this point of view, it is preferred that the polyolefin-based resin of the cover layer has a melting point lower than that of the polyolefin-based resin of the expanded core layer by 0 to 80° C., more preferably by 1 to 80° C., more preferably by 5 to 60° C., still more preferably by 10 to 50° C., especially preferably by 15 to 45° C.

The expanded core layer of the expanded beads of the present invention is next described. The expanded core layer is formed of a base resin composed primarily of a polyolefin-based resin. As the polyolefin-based resin, the same polyolefin-based resins for the cover layer may be used. Among the polyolefin-based resins, the use of a polypropylene-based resin is preferred because polypropylene-based resins are well-balanced in terms of expansion moldability and mechanical properties. Among polypropylene-based resins, polypropylene-ethylene random copolymer, polypropylene-butene random copolymer, polypropylene-ethylene-butene random copolymer are preferred, and polypropylene-ethylene random copolymer is especially preferred.

The base resin of the expanded core layer may contain a thermoplastic resin or thermoplastic elastomer in addition to the polypropylene-based resin to the extent that the intended object of the present invention is not impaired. Examples of the thermoplastic resin include polyolefin-based resins such as polyethylene, polystyrene-based resins such as polystyrene, impact-resistant polystyrene and styrene-acrylonitrile copolymer, acrylic-based resins such as methyl polymethacrylate, and polyester-based resins such as polylactic acid and polyethylene terephthalate. Examples of the thermoplastic elastomer include olefin-based elastomers such as ethylene-hexene copolymerized elastomer, ethylene-octene copolymerized elastomer and ethylene-propylene-diene copolymerized elastomer, and styrene-based elastomers such as styrene-butadiene-styrene block copolymerized elastomer, styrene-isoprene-styrene block copolymerized elastomer and hydrogenation products thereof.

In addition, the expanded core layer may contain additives, such as coloring agent, lubricant, catalyst neutralizing agent and antioxidant, as needed to the extent that the object of the present invention is not impaired. The content of the additives is preferably 15 parts by weight or less, more preferably 10 parts by weight or less, still more preferably 5 parts by weight or less, especially preferably 1 parts by weight or less based on 100 parts by weight of the base resin of the expanded core layer although it depends on the type of the additives.

Because the expanded beads for use in the production of the expanded beads molded article of the present invention has a specific cover layer, the resulting expanded beads molded article exhibits electrostatic dissipating properties even if the expanded core layer does not contain an electrically conductive material, such as an electrically conductive carbon black. In particular, when the expanded core layer does not contain an electrically conductive material, the expanded beads have excellent expansion moldability and therefore will have a high closed cell content. As a result, an expanded beads molded article which has such high dimensional stability as to undergo little contraction after in-mold molding can be produced with high productivity. In addition, the internal pressure in the expanded beads can be increased easily, an expanded beads molded article having a low apparent density (a high expansion ratio) can be obtained easily.

The weight ratio of the expanded core layer to the cover layer is preferably 99.5:0.5 to 65:35, more preferably 99:1 to 70:30, still more preferably 97:3 to 75:25, especially preferably 97:3 to 80:20. When the weight proportion of the cover layer falls within the above range, a surface resistivity of $1\times10^5$ to $1\times10^{10}\Omega$ may be stably achieved and stable electrostatic dissipation properties may be therefore stably achieved, throughout the desired range of the apparent density of the expanded beads. As a consequence, an expanded beads molded article obtained therefrom exhibits both stable electrostatic dissipating properties and excellent mechanical strength. The weight ratio of the expanded core layer to the cover layer can be adjusted by, for example, adjusting the ratio of the amount of feed of the ingredients of the resin particle core layer to the amount of feed of the ingredients of the resin particle outer layer at the time production of the multi-layered resin particles as described later.

The cover layer preferably has an average thickness of 0.2 μm or greater, more preferably 1 μm or greater, still more preferably 3 μm or greater, especially preferably 5 μm or greater in order to achieve more stable electrostatic dissipating properties. The stability of the electrostatic dissipating properties does not increase as the cover layer is thicker. For this reason, the upper limit of the average thickness of the cover layer is preferably 200 μm, more preferably 100 μm, still more preferably 50 μm.

In the present invention, the average thickness of the cover layer of the expanded beads is calculated based on the weight, apparent density and L(length)/D(diameter) ratio of the expanded beads, the weight proportion of the resin in the resin particle core layer of the multi-layered resin particles before expansion, the density of the cover layer, and so on because the boundary between the expanded core layer and the cover layer is not clear and because the thickness of the cover layer is difficult to measure when it is small. The average thickness of the cover layer of the expanded beads is calculated based on the assumption that the multi-layered resin particles are expanded into expanded beads having a similar shape for simplicity of the calculation.

Specifically, when expanded beads are obtained from cylindrical multi-layered resin particles, the average thickness (Tt) of the cover layer of the expanded beads can be calculated using the following equations (1) to (3).

$$Pd = \{(4 \times W)/(\pi \times Ld \times Db)\}^{(1/3)} \quad (1)$$

wherein Pd represents the diameter (cm) of the cylindrical expanded beads, W represents the weight (g) of the multi-layered resin particles, Db represents the apparent density (g/cm³) of the expanded beads, and Ld represents the L/D ratio of the expanded beads in the case where the multi-layered resin particles are expanded into a similar shape.

$$Cd = \{Pd^2 - (4 \times R \times W)/(\pi \times Pd \times Ld \times \rho)\}^{(1/2)} \quad (2)$$

wherein Cd represents the diameter (cm) of the core layer in the cylindrical expanded beads, R represents the weight proportion (non-dimensional) of the resin particle outer layer in the multi-layered resin particles, and ρ represents the density (g/cm³) of the cover layer.

$$Tt(\mu m) = \{(Pd-Cd)/2\} \times 10000 \quad (3)$$

When the expanded beads are obtained from spherical multi-layered resin particles, the average thickness (Tt) of the cover layer of the expanded beads can be calculated using the equation (5), which is obtained by transforming the equation (4) below.

$$S/\rho = \pi/6\{X \times d^3 - X(d - 2\times Tt \times 10000)^3\} \quad (4)$$

$$Tt(\mu m) = [-\{(6\times S)/(\rho \times \pi \times X) + d^3\}^{(1/3)} - d]/(-20000) \quad (5)$$

wherein d represents the diameter (cm) of the spherical multi-layered resin particles, S represents the weight (g) of the resin particle outer layer of the multi-layered resin particles, X represents the expansion ratio (non-dimensional) of the expanded beads (density (g/cm³) of the multi-layered resin particles/apparent density Db (g/cm³) of the expanded beads), and ρ represents the density (g/cm³) of the cover layer.

A desired average thickness of the cover layer of the expanded beads can be achieved by adjusting the weight ratio of the resin particle outer layer to the resin particle core layer in the multi-layered resin particles, and the L/D ratio and diameter of the multi-layered resin particles based on the desired apparent density (expansion ratio) of the expanded beads.

The expanded beads used in the present invention are obtained by expanding the above-described multi-layered resin particles. The expanded beads preferably have an apparent density of 10 to 130 kg/m³ for reasons that they can give a molded article that exhibits dielectric dissipating properties in a stable manner. When the apparent density of the expanded beads is excessively low, there is a possibility that the molded article obtained therefrom fails to show sufficiently high mechanical strength. When the apparent density is excessively high, on the other hand, there is a possibility that light weight property of the resulting molded article is deteriorated. For these reasons, the apparent density of the expanded beads is more preferably 12 to 120 kg/m³, more preferably 15 to 110 kg/m³.

As used herein, the apparent density of the expanded beads is determined as follows. In a measuring cylinder containing water at 23° C., an amount (W [g]) of the expanded beads is immersed using a wire net. From a rise of the water level, the volume V [cm³] of the expanded beads placed in the measuring cylinder is determined. The apparent density is calculated by dividing the weight of the expanded beads placed in the measuring cylinder by the volume thereof (W/V), followed by unit conversion from [g/cm³] into [kg/cm³].

The expanded beads preferably have an average cell diameter of 20 to 400 μm, more preferably 40 to 250 μm, still more preferably 100 to 230 μm, not only because of excellent in-mold moldability thereof but also because the expanded beads molded article obtained therefrom has good dimension recovery characteristics and excellent mechanical properties such as compressive properties.

As used herein, the average cell diameter of the expanded beads is measured as follows. One expanded bead is cut into nearly equal halves. From an enlarged image of the cross section taken by a microscope, the average cell diameter is determined as follows. On the enlarged image of the cross section of the expanded bead, four line segments each passing nearly through the center of the cross section and extending from one surface of the expanded bead to the other surface thereof are drawn such that eight angularly equally spaced straight lines extend radially from nearly the center of the cross section toward the external surface of the expanded bead. A total number (N) of cells that intersect the above four line segments is counted. Also measured is a total length (L(μm)) of the four line segments. The value (L/N) obtained by dividing the total length L by the total number N is an average cell diameter of the expanded bead. Similar procedures are repeated for 10 expanded beads in total. The arithmetic mean of the average cell diameters of the ten expanded beads represents the average cell diameter of the expanded beads.

The expanded beads preferably have a closed cell content of 75% or more, more preferably 80% or more, still more preferably 82% or more, particularly preferably 85% or more. When the closed cell content is within the above range, the expanded beads show sufficiently high secondary expansion property and give an expanded beads molded article having excellent mechanical strength.

As used herein, the closed cell content of the expanded beads is measured as follows. The expanded beads are allowed to stand for 10 days for aging in a thermostatic chamber at 23° C. under atmospheric pressure and a relative humidity of 50%. In the same thermostatic chamber, about 20 cm$^3$ bulk volume of the expanded beads thus aged are sampled and measured for the precise apparent volume Va by a water immersion method. The sample whose apparent volume Va has been measured is fully dried and measured for its true volume Vx according to Procedure C of ASTM D-2856-70 using Air Comparison Pycnometer Type-930 manufactured by Toshiba Beckman Inc. From the volumes Va and Vx, the closed cell content is calculated by the formula (6). Similar measurement is carried out 5 times in total. The arithmetic mean of the 5 measured values is the closed cell content of the expanded beads (n=5).

$$\text{Closed cell content}(\%) = (Vx - W/\rho) \times 100/(Va - W/\rho) \quad (6)$$

wherein

Vx represents the true volume (cm$^3$) of the expanded beads measured by the above method, which corresponds to a sum of a volume of the resin constituting the expanded beads and a total volume of all the closed cells in the expanded beads, Va represents an apparent volume (cm$^3$) of the expanded beads, which is measured by a rise of the water level when the expanded beads are immersed in water contained in a measuring cylinder, W is a weight (g) of the sample expanded beads used for the measurement; and $\rho$ is a density (g/cm$^3$) of the resin composition constituting the expanded beads.

It is also preferred that the expanded beads have secondary crystals and that the heat of fusion of the secondary crystals as measured by differential thermal analysis is 1 to 30 J/g. Namely, it is preferred that the expanded beads, when measured by heat flux differential scanning calorimetry in which 2 to 10 mg thereof are heated from 23° C. to 220° C. at a heating rate of 10° C./min, give a DSC curve (first time heating DSC curve) having an endothermic peak "A" which is intrinsic to the polyolefin-based resin (hereinafter occasionally referred to simply as "intrinsic peak") and one or more endothermic peaks "B" (hereinafter occasionally referred to simply as "high temperature peak") which are located on a higher temperature side of the endothermic peak "A" and which have a heat of fusion of 1 to 30 J/g. When the calorific value of the high temperature peak is within the above range, the expanded beads show excellent fusion-bonding properties during the in-mold molding and can give an expanded beads molded article having excellent mechanical properties.

The upper limit of the calorific value of the high temperature peak is preferably 18 J/g, more preferably 17 J/g, still more preferably 16 J/g, while the lower limit thereof is preferably 4 J/g. Incidentally, the heat of fusion of the high temperature peak may be controlled by any known manner such as by a method disclosed in Japanese publication No. JP-A-2001-151928.

As used herein, the first time heating DSC curve, intrinsic peak calorific value and high temperature peak calorific value are measured by a measuring method according to JIS K7122 (1987) as follows.

Figure 1:
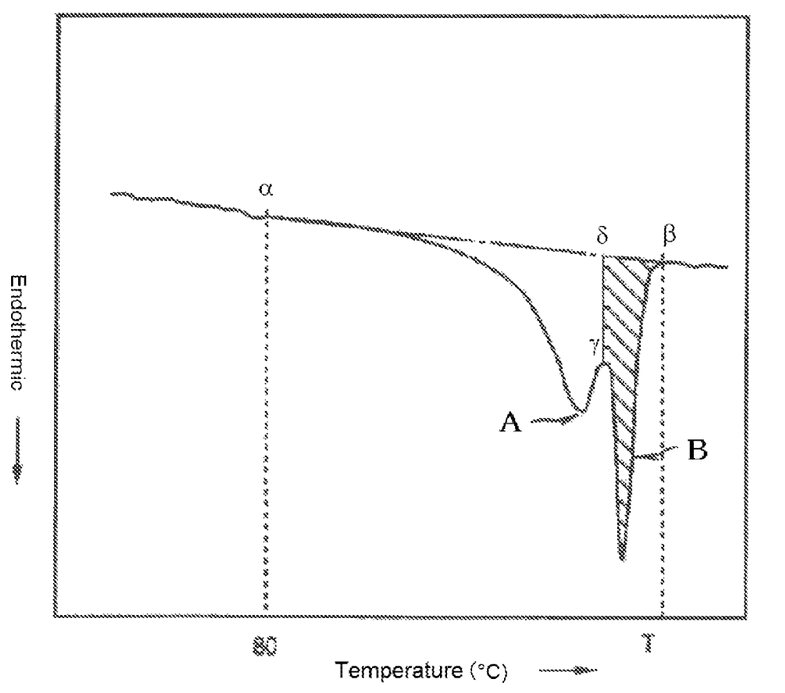
FIG. 1 is a graph showing an example of a DSC curve during a first heating process.

Expanded beads (2 to 10 mg) are sampled and heated using a differential scanning calorimeter from 23° C. to 220° C. at a heating rate of 10° C./minute to obtain a first heating DSC curve an example of which is shown in FIG. 1.

The DSC curve shown in FIG. 1 has an intrinsic peak "A" attributed to the polyolefin-based resin forming the expanded beads and a high temperature peak "B" located on a high temperature side of the intrinsic peak. The calorific value of the high temperature peak "B" corresponds to the area of the peak and is determined in the manner specifically described below. First, a straight line ($\alpha$–$\beta$) extending between a point $\alpha$ on the DSC curve at 80° C. and a point $\beta$ on the DSC curve at a melting completion temperature T of the expanded beads is drawn. The melting completion temperature T is a temperature of an intersection at which the DSC curve on a high temperature side of the high temperature peak "B" meets the base line. Next, a line which is parallel with the ordinate and which passes a point $\gamma$ on the DSC curve at the bottom of the valley between the intrinsic peak "A" and the high temperature peak "B" is drawn. This line crosses the line ($\alpha$–$\beta$) at a point $\delta$. The area of the high temperature peak "B" is the area (shaded portion in FIG. 1) defined by the curve of the high temperature peak "B", the line ($\delta$–$\beta$) and the line ($\gamma$–$\delta$), and corresponds to the calorific value of the high temperature peak.

Incidentally, the high-temperature peak "B" appears in the DSC curve measured in the first time heating as described above, but does not appear in the DSC curve obtained during heating in the second time. In the second time heating DSC curve, only the endothermic peak inherent to the polyolefin-based resin forming the expanded beads is present.

The expanded beads molded article of the present invention, which is obtained by molding the above-described expanded beads in a mold cavity, preferably has an apparent density of 10 to 90 kg/m$^3$, more preferably 10 to 80 kg/m$^3$, still more preferably 10 to 50 kg/m$^3$. When the apparent density of the molded article is excessively low, there is a possibility that the mechanical strength is so low that the molded article cannot be properly used as, for example, a packaging material. When the apparent density of the molded article is excessively high, on the other hand, there is a possibility that the cushioning property required for actual use thereof as, for example, a packaging material, is insufficient.

The expanded beads molded article preferably has a 50% compressive stress of 70 to 500 kPa, more preferably 100 to 450 kPa, still more preferably 200 to 400 kPa. When the 50% compressive stress is excessively low, there is a possibility that the molded article cannot be used as a packaging material. When the 50% compressive stress is excessively high, on the other hand, there is a possibility that the molded article cannot be used as a packaging material due to its insufficient cushioning property.

The expanded beads molded article preferably has a bending modulus of 1 to 12 MPa, more preferably 2 to 9 MPa. When the bending modulus is excessively low, there is a possibility that the molded article cannot be used as a packaging material. When the bending modulus is excessively high, on the other hand, there is a possibility that the molded article cannot be used as a packaging material due to its insufficient cushioning property.

The expanded beads molded article preferably has a closed cell content of 75% or more, more preferably 80% or more, still more preferably 82% or more, particularly preferably 85% or more. When the closed cell content is excessively low, there is a possibility that the molded article has a low apparent density and has poor mechanical properties.

The closed cell content of the expanded beads molded article is measured as follows. The molded article is allowed to stand, for aging, for 10 days in a thermostatic chamber at 23° C. under atmospheric pressure and a relative humidity of 50%. A sample with a size of 25×25×20 mm is cut out from the aged molded article and measured for its closed cell content in the same manner as that for the above-described measurement of the closed cell content of the expanded beads.

The expanded beads molded article preferably has a ratio Cs/Ad of the 50% compressive stress Cs [kPa] thereof to the apparent density Ad [kg/m$^3$] thereof of at least 6:1, more preferably at least 7:1, for reasons that such a molded article has excellent mechanical strength despite of its low apparent density and lightness in weight and is suitably usable as a packaging material for electric and electronic parts. The upper limit of the Cs/Ad ratio is generally 10:1, preferably 9:1.

The expanded beads molded article having a Cs/Ad ratio of at least 6:1 may be obtained by using multi-layered expanded beads that are formed of a polyolefin resin having excellent mechanical strength and that have a high closed cell content. In this regard, it is preferred that both of the expanded core layer and the cover layer are formed of a polypropylene resin. Additionally, it is desired that the polymeric antistatic agent (B) and the conductive carbon black (C) are contained only in the cover layer; i.e. they are not contained in the expanded core layer, since the closed cell content of the expanded core layer tends to be lowered by addition of the polymeric antistatic agent (B) and/or the conductive carbon black (C).

The expanded beads molded article of the present invention has a surface resistivity of $1\times10^5$ to $1\times10^{10}\Omega$, preferably $1\times10^6$ to $1\times10^9\Omega$, and, hence, exhibits stable static dissipative property. For this reason, the molded article can be suitably used as packaging materials for electronic parts such as integrated circuits and hard disks. As used herein the surface resistivity is a value as measured according to JIS C2170 (2004), Paragraph 8, "Measurement of resistance of static dissipative material (used to prevent accumulation of electrostatic charge)".

Description will be next made of a method for producing the expanded beads molded article of the present invention. The molded article may be produced by in-mold molding multi-layered expanded beads which in turn are prepared by expanding multi-layered resin particles each having a resin particle core layer and a resin particle outer layer which covers the core layer and which contains a polyolefin resin (A), a polymeric antistatic agent (B) and electrically conductive carbon black (C).

The multi-layered resin particles may be obtained by a method in which a device having two extruders, i.e. a first extruder for forming the core layer and a second extruder for forming the outer layer are connected to a coextrusion die, is used. In this method, a polyolefin-based resin for forming the core layer and, if needed, additives such as a cell controlling gent are fed to the first extruder and melted and kneaded to obtain a first melt for forming the core layer. On the other hand, the polyolefin resin (A), polymeric antistatic agent (B) and electrically conductive carbon black (C) are fed to the second extruder and melted and kneaded to obtain a second melt for forming the outer layer. The first melt is then introduced into the coextrusion die where it is formed into a linear stream. The second melt is simultaneously introduced into the coextrusion die where it is allowed to surround the linear stream of the first melt, so that a combined melt stream having a sheath-core structure in which a core of the first melt is covered with a sheath of the second melt are formed within the coextrusion die. By using a known suitable manifold, a plurality of such combined melt streams each having the sheath-core structure may be obtained. The combined melt stream or streams are then extruded in the form of one or more strands through small holes of a mouthpiece attached to a die exit at a tip of the extruder. Each strand is immersed into water for cooling and cut to obtain the multi-layered resin particles. The cooling is simultaneous with or followed by the cutting.

The method for producing extrudates having a sheath-core structure is disclosed in, for example, Japanese Examined Patent Publications Nos. JP-S41-16125, JP-S43-23858 and JP-S44-29522 and Japanese Unexamined Patent Publication No. JP-A-S60-185816.

Although the polyolefin resin (A), polymeric antistatic agent (B) and electrically conductive carbon black (C) are fed and kneaded as such in the extruder to obtain the second melt, it is preferred that the polymeric antistatic agent (B) and electrically conductive carbon black (C) are previously separately kneaded with the polyolefin resin (A) to obtain respective master batches. These master batches and, if necessary the polyolefin resin (A) are then fed to the extruder and kneaded to form the second melt.

The concentration of the conductive carbon black in the master batch is preferably 5 to 50% by weight, more preferably 8 to 30% by weight, still more preferably 9 to 25% by weight. The master batch preferably contains an olefin-based elastomer such as an ethylene-octene copolymerized elastomer or an ethylene-propylene-diene copolymerized elastomer, in an amount of preferably 3 to 10% by weight.

In order to effectively control the cell diameter of the expanded core layer, it is preferred that the resin particle core layer contains a cell controlling agent such as an inorganic powder, examples of which include talc, calcium carbonate, borax, zinc borate, aluminum hydroxide and alum. The cell controlling agent is preferably used in an amount of 0.001 to 10 parts by weight, more preferably 0.01 to 5 parts by weight, per 100 parts by weight of the base resin that constitutes the resin particle core layer. Although the cell controlling agent may be fed and kneaded as such with the polyolefin resin in the extruder to obtain the first melt, it is preferred that the cell controlling agent is previously kneaded with an amount of the polyolefin resin to obtain a master batch for reasons of improved dispersion state. The master batch is then kneaded with an additional amount of the polyolefin resin to obtain the first melt.

The multi-layered resin particles preferably have a weight per particle of 0.02 to 20 mg, more preferably 0.1 to 6 mg, since the expanded beads obtained therefrom can be uniformly filled in a mold cavity.

The multi-layered resin particles may be expanded, for example, by so-called dispersing medium releasing expansion method. In this method, the multi-layered resin particles are dispersed in an aqueous medium, such as water, contained in a closed vessel such as autoclave together with a physical blowing agent and any desired optional additive.

The aqueous medium is then heated to a temperature not lower than the softening point of the base resin forming the core layer to impregnate the multi-layered resin particles with the blowing agent. While maintaining the pressure inside the closed vessel at a pressure not lower than the vapor pressure of the blowing agent, an end portion of the closed vessel that is located beneath the water level is opened to release the blowing agent-impregnated resin particles together with the aqueous medium from the closed vessel to an atmosphere which is maintained at a pressure lower than that in the vessel, thereby obtaining the multi-layered expanded beads.

In an alternative method, the multi-layered resin particles are first placed in a closed vessel, into which a physical blowing agent is injected. The resin particles containing the physical blowing agent are then taken out of the closed vessel and heated with a suitable heating medium such steam, thereby obtaining the multi-layered expanded beads. In a further method, the above-described method for producing multi-layered resin particles is modified such that a physical blowing agent is injected into the above-described first extruder. Thus, the first melt formed in the first extruder is in the form of a foamable melt. The foamable melt is introduced into the coextrusion die where it is allowed to be surrounded by the above-described second melt, so that a combined melt stream having a sheath-core structure is formed. By extruding the combined melt stream, the core layer of the extrudate expands and foams. The extrudate is then cooled and cut to obtain the multi-layered expanded beads.

The discharge of the multi-layered resin particles from a higher pressure zone in which no expansion thereof takes place to a lower pressure zone in which the expansion there of takes place is preferably performed such that a difference in pressure therebetween is generally at least 400 kPa, preferably 500 to 15,000 kPa.

The blowing agent used in the production of the expanded beads may be an organic physical blowing agent such as propane, isobutane, normal butane, isopentane, normal pentane, cyclopentane, normal hexane, cyclobutane, cyclohexane, chlorofluoromethane, trifluoromethane, 1,1,1,2-tetrafluoroethane, 1-chloro-1,1-difluoroethane, 1,1-difluoroethane and 1-chloro-1,2,2,2-tetrafluoroethane, or an inorganic physical blowing agent such as nitrogen, carbon dioxide, argon and air. For reasons of low costs and freedom of destruction of the ozone layer, the use of inorganic physical blowing agent, especially air, nitrogen and carbon dioxide is preferred. The above blowing agents may be used in combination of two or more thereof.

The amount of the blowing agent is determined as appropriate in view of the intended apparent density of the expanded beads and the temperature at which the expansion is carried out. In general, the blowing agent other than nitrogen and air is used in an amount of 2 to 50 parts by weight per 100 parts by weight of the resin particles. In the case of nitrogen and air, the blowing agent is used in an amount so that the pressure within the closed vessel is in the range of 1 to 7 MPa(G).

As the dispersing medium for dispersing the resin particles in the closed vessel, water is preferred. However, other media, such as ethylene glycol, glycerin, methanol and ethanol, may be used as long as the resin particles are not dissolved therein.

The average cell diameter of the expanded beads may be controlled by adjustment of the kind and amount of the blowing agent, the expansion temperature and the amount of the cell controlling agent. The apparent density (expansion ratio) of the expanded beads may be controlled by adjustment of the kind of the blowing agent, the expansion temperature and the above-described difference in pressure at the time of the expansion. The apparent density of the expanded beads is smaller with an increase of the amount of the blowing agent, the expansion temperature and the pressure difference.

A melt-adhesion preventing agent may be incorporated into the dispersing medium for the purpose of preventing the resin particles dispersed therein from melt-adhering to each other during heating of the dispersion at the time of the expansion. Any organic and inorganic solid particles may be used as the melt-adhesion preventing agent, as long as they are insoluble in the dispersing medium and are not fused at the temperature at which the expansion is carried out. Inorganic particles are particularly preferably used.

Examples of the melt-adhesion preventing agent include powders of kaolin, talc, mica, aluminum oxide, titanium oxide and aluminum hydroxide. The melt-adhesion preventing agent preferably has an average particle diameter of 0.001 to 100 μm, more preferably 0.001 to 30 μm and is preferably used in an amount of 0.01 to 10 parts by weight per 100 parts by weight of the resin particles.

The dispersing medium may also be suitably incorporated with a dispersing aid such as an anionic surfactant, e.g. sodium dodecylbenzenesulfonate and sodium oleate, and aluminum sulfate. The dispersing aid is preferably used in an amount of 0.001 to 5 parts by eight per 100 parts by weight of the resin particles.

When particularly low apparent density expanded beads are to be produced, it is desirable to conduct so-called two-step expansion in which expanded beads are produced in a first step by the above-described dispersing medium releasing expansion method or the like method, the obtained expanded beads being thereafter subjected to a further expansion treatment as a second step. More specifically, the expanded beads obtained in the first step are charged in a pressure resistant closed vessel and are subjected to a pressurizing treatment using a pressurized gas such as air so that the inner pressure in the expanded beads is increased to 0.01 to 0.6 MPa(G). The resulting expanded beads are then taken out of the closed vessel and heated with a heating medium such as steam thereby to obtain expanded beads having a lowed apparent density.

The molded article of the expanded polyolefin resin beads according to the present invention may be produced by in-mold molding the above-described multi-layered expanded beads. The in-mold molding may be carried out by, for example, filling the multi-layered expanded beads in a mold cavity and feeding steam into the mold cavity to heat, expand and fuse-bond the expanded beads to each other, thereby obtaining the molded article having a shape conforming to the mold cavity. If desired, the expanded beads may be subjected to a pressurizing treatment to increase the inside pressure of the expanded beads to 0.01 to 0.2 MPa(G) in the same manner as that of the second step of the two-step expansion.

After the fusion-bonding of the expanded beads have been completed, the molded article is generally cooled with water. The cooling may be also carried out by a vacuum method in which the mold cavity is evacuated to cool the molded article by utilizing the heat of vaporization of steam.

If desired, the expanded beads may be compressively filled in the mold cavity with a compression ratio of 4 to 25%, more preferably 5 to 20%, and then heated with steam to obtain a molded article.

The compression ratio can be controlled by charging the expanded beads in the mold cavity in an amount greater than the inside volume of the mold cavity. In the in-mold molding method, it is the general practice not to fully close the molds but to maintain the molds in a slightly opened state for the purpose of efficiently filling the expanded beads in the mold cavity and of facilitating purge of the remaining air from the mold cavity. Such a slight opening of the molds is generally called cracking. Just before the full heating of the expanded beads with steam to expand and fuse-bond the expanded beads together is carried out, the molds are fully closed and, therefore, the expanded beads are compressed. By adjusting the degree of cracking of the molds, therefore, the compression ratio may be controlled.

The following examples and comparative examples will further illustrate the present invention, in which all parts are by weight. It is to be noted that the present invention is not limited to the examples.

The kinds and properties of the polypropylene-based resins used as polyolefin-based resins (A), polymeric antistatic agents (B), electrically conductive carbon blacks (C) and olefin-based elastomers are shown in Tables 1, 2, 3 and 4, respectively.

TABLE 1

| Polyolefin-based resin (A) | Abbreviation | PP1 | PP2 |
|---|---|---|---|
| | Kind of resin | Ethylene-propylene random copolymer | Ethylene-propylene random copolymer |
| | Ethylene content (%) | 3.6 | 2.8 |
| | Melting point (° C.) | 136 | 143 |
| | Glass transition temperature (° C.) | 3 | 3 |
| | MFR (g/10 min) | 8.2 | 5.1 |

TABLE 2

| Polymeric antistatic agent (B) | Abbreviation | ASP1 | ASP2 |
|---|---|---|---|
| | Product name | PELESTAT 230 | PELECTRON HS |
| | Kind of resin | Polyether/polyolefin block polymer | Polyether/polyolefin block polymer |
| | Density of resin (g/cm³) | 1.0 | 1.0 |
| | Melting point (° C.) | 155 | 132 |
| | Glass transition temperature (° C.) | <−70 | <−70 |
| | MFR(g/10 min) | 101 | 65 |

TABLE 3

| Electrically conductive carbon black (C) | Abbreviation | CB1 | CB2 |
|---|---|---|---|
| | Kind | Oil furnace black | Acetylene black |
| | Product name | Ketjen Black EC300J | Toka Black #5500 |
| | DBP oil absorption amount (cm³/100 g) | 360 | 155 |
| | Particle size (nm) | 40 | 25 |

TABLE 4

| Olefin-based elastomer | Abbreviation | EO1 |
|---|---|---|
| | Kind of resin | Ethylene-octene copolymerized elastomer |
| | Density of resin (g/cm³) | 0.87 |
| | Melting point (° C.) | 59 |

TABLE 4-continued

| | |
|---|---|
| Glass transition temperature (° C.) | <−70 |
| MFR(g/10 min) | 10.1 |

In Tables 1, 2 and 4, MFR is as measured according to JIS K7120 (1999), Condition M (at a temperature of 230° C. and a load of 2.16 kg).

Examples 1 to 12 and Comparative Examples 1 to 7

Preparation of Carbon Black Master Batches MB1 to MB4

MB1:
To a twin screw extruder having an inside diameter of 47 mm, 80 parts of PP1 shown in Table 1 as a base resin, 15 parts of CB1 shown in Table 3 as an electrically conductive carbon black and 5 parts of EO1 shown in Table 4 as an olefin-based elastomer were fed and kneaded at 200 to 220° C. The kneaded mass was extruded into strands. The strands are cooled and cut to obtain carbon black master batch MB1.

MB2:
To a twin screw extruder having an inside diameter of 30 mm, 85 parts of PP1 shown in Table 1 as a base resin and 15 parts of CB1 shown in Table 3 as an electrically conductive carbon black were fed and kneaded at 200 to 220° C. The kneaded mass was extruded into strands. The strands are cooled and cut to obtain carbon black master batch MB2.

MB3:
To a twin screw extruder having an inside diameter of 30 mm, 70 parts of PP1 shown in Table 1 as a base resin and 30 parts of CB2 shown in Table 3 as an electrically conductive carbon black were fed and kneaded at 200 to 220° C. The kneaded mass was extruded into strands. The strands are cooled and cut to obtain carbon black master batch MB3.

MB4:
To a twin screw extruder having an inside diameter of 30 mm, 55 parts of PP2 shown in Table 1 as a base resin and 45 parts of carbon black colorant (Product Name: #650B) were fed and kneaded at 200 to 220° C. The kneaded mass was extruded into strands. The strands are cooled and cut to obtain carbon black master batch MB4.

Preparation of Electrically Conductive Resin Pellets

In Examples 1 to 12, to a twin screw extruder having an inside diameter of 30 mm, the polypropylene-based resin (PP1) and the above carbon black master batch (MB1 in Examples 1 to 5, 7 to 8 and 10 to 12, MB2 in Example 6 and MB3 in Example 9) were fed, heated, melted and kneaded at 200 to 220° C. The kneaded mass was extruded into strands. The strands were cooled with water and cut with a pelletizer to obtain electrically conductive resin pellets for forming a resin particle outer layer. The amounts of the polypropylene-based resin (PP1) and carbon black master batch (MB1, MB2 or MB3) fed to the extruder were such that the contents of the polypropylene-based resin (PP1), polymeric antistatic agent (ASP1 or ASP2), electrically conductive carbon black (CB1 or CB2) and olefin-based elastomer (EO1) are as shown in Tables 5 and 6.

In Comparative Examples 1 to 3, electrically conductive resin pellets for forming a resin particle outer layer were prepared in the same manner as that in the above Example 1, except that the amounts of the polypropylene-based resin (PP1) and carbon black master batch (MB2 in Comparative Examples 1 and 2 and MB3 in Comparative Example 3) fed to the extruder were such that the contents of the polypropylene-based resin (PP1), electrically conductive carbon black (CB1 in Comparative Examples 1 and 2 and CB2 in Comparative Example 3) and olefin-based elastomer (EO1) are as shown in Table 7.

In Comparative Examples 4 to 7, electrically conductive resin pellets for forming a resin particle outer layer were prepared in the same manner as that in the above Example 1, except that the amounts of the polypropylene-based resin (PP1) and carbon black master batch (MB1) fed to the extruder were such that the contents of the polypropylene-based resin (PP1), electrically conductive carbon black (CB1) and olefin-based elastomer (EO1) are as shown in Table 7.

Preparation of Multi-Layered Resin Particles

An extrusion device having a first extruder (inside diameter: 65 mm) for forming a resin particle core layer, a second extruder (inside diameter: 30 mm) for forming a resin particle outer layer and a coextrusion die which was attached to exits of the first and second extruders was used. The polypropylene-based resin (PP2) shown in Table 1 was fed to the first extruder together with zinc borate (cell controlling agent) and the black colorant master batch (MB4), while the above-described electrically conductive resin pellets were fed to the second extruder. The contents in each of the first and second extruders were then heated, melted and kneaded at a temperature of 200 to 220° C. The melts in the extruders were introduced into the coextrusion die and combined. The combined melt stream was then extruded in the form of strands through small holes of a mouthpiece attached to a die exit. Each of the strands had a multi-layer structure having a core layer and an annular outer layer covering the core layer. The extruded strands were cooled with water and cut with a pelletizer into columnar multi-layered resin particles each having a resin particle core layer and a resin particle outer layer. The multi-layered resin particles had a weight per one particle of about 2 mg and an L/D (length/diameter) ratio of 2.4. The weight and L/D herein are each arithmetic mean value of randomly selected 100 multi-layered resin particles. The zinc borate was used in an amount so that the content of the zinc borate in the resin particle core layer was 1,000 ppm by weight. The black colorant master batch (MB4) was used in an amount so that the carbon black (black colorant) was present in the resin particle core layer in an amount of 7 parts per 100 parts of the polypropylene-based resin (PP2).

Preparation of Multi-Layered Expanded Beads

The thus obtained multi-layered resin particles (1 kg) were charged in a 5 L autoclave together with 3 L of water as a dispersing medium, to which 3 g of kaolin as a dispersing agent, 0.04 g of sodium alkylbenzenesulfonate as a dispersing aid and 0.1 g of aluminum sulfate were added. Carbon dioxide as a blowing agent was then injected into the autoclave in an amount so that the inside pressure of the autoclave was as shown in Tables 5 to 7. The contents were heated with stirring until a foaming temperature lower shown in Tables 5 to 7 was reached and then maintained at the foaming temperature for 15 minutes to adjust the calorific value of the high temperature peak. Thereafter, the contents in the autoclave were released to atmospheric pressure together with water to obtain multi-layered expanded beads.

Two-Step Expansion:

In Examples 4 and 5 and Comparative Examples 5 to 7, the multi-layered expanded beads obtained above were subjected to a further expansion treatment to obtain low apparent density expanded beads. Namely, the obtained multi-layered expanded beads were placed in a closed vessel and pressurized with air so that the inside pressure of the expanded beads was increased by 0.5 MPa(G). The expanded beads having an increased inside pressure were then taken out of the closed vessel and heated with steam to obtain low apparent density expanded beads. No such further expansion treatment was carried out in Examples 1 to 3 and 6 to 12 and Comparative Examples 1 to 4.

The physical properties of the multi-layered resin particles and the multi-layered expanded beads obtained in Examples 1 to 12 and Comparative Examples 1 to 7 are shown in Tables 5 to 7.

TABLE 5

| | | | | Example | | | | | |
|---|---|---|---|---|---|---|---|---|---|
| | | | | 1 | 2 | 3 | 4 | 5 | 6 |
| Resin particles | Outer layer | Polyolefin-based resin (A) | Kind | PP1 | PP1 | PP1 | PP1 | PP1 | PP1 |
| | | | Parts | 94 | 94 | 94 | 94 | 94 | 99 |
| | | Polymeric antistatic agent (B) | Kind | ASP1 | ASP1 | ASP1 | ASP1 | ASP1 | ASP1 |
| | | | Parts | 6 | 6 | 6 | 6 | 6 | 1 |
| | | Electrically conductive carbon black (C) | Kind | CB1 | CB1 | CB1 | CB1 | CB1 | CB1 |
| | | | Parts | 10 | 10 | 10 | 10 | 10 | 10 |
| | | Olefin-based elastomer | Kind | EO1 | EO1 | EO1 | EO1 | EO1 | — |
| | | | Parts | 3 | 3 | 3 | 3 | 3 | 0 |
| | Core layer | Polypropylene-based resin | Kind | PP2 | PP2 | PP2 | PP2 | PP2 | PP2 |
| | Outer layer/core layer weight ratio | | — | 10/90 | 5/95 | 15/85 | 10/90 | 10/90 | 10/90 |
| | Surface resistivity (10% RH) | | Ω | $1.3 \times 10^2$ | $1.3 \times 10^2$ | $1.3 \times 10^2$ | $1.3 \times 10^2$ | $1.3 \times 10^2$ | $1.2 \times 10^2$ |
| Expanded beads | Expansion conditions | Blowing agent | — | $CO_2$ | $CO_2$ | $CO_2$ | $CO_2$ | $CO_2$ | $CO_2$ |
| | | Autoclave inside pressure | MPa | 3.5 | 3.5 | 3.5 | 4.3 | 3.5 | 4.3 |
| | | Foaming temperature | ° C. | 147 | 147 | 147 | 143 | 147 | 143 |
| | Physical properties | Apparent density | kg/m$^3$ | 62 | 66 | 63 | 18 | 31 | 65 |
| | | Average cell diameter | μm | 210 | 190 | 210 | 200 | 220 | 190 |
| | | Average thickness of cover layer | μm | 6.6 | 3.3 | 9.9 | 1.0 | 2.0 | 6.6 |
| | | High temperature peak calorific value | J/g | 12.4 | 12.1 | 12.5 | 13.1 | 12.1 | 13.1 |

TABLE 6

| | | | | Example | | | | | |
|---|---|---|---|---|---|---|---|---|---|
| | | | | 7 | 8 | 9 | 10 | 11 | 12 |
| Resin particles | Outer layer | Polyolefin-based resin (A) | Kind | PP1 | PP1 | PP1 | PP1 | PP1 | PP1 |
| | | | Parts | 89 | 89 | 89 | 83 | 66 | 94 |
| | | Polymeric antistatic agent (B) | Kind | ASP1 | ASP1 | ASP1 | ASP1 | ASP1 | ASP2 |
| | | | Parts | 11 | 11 | 11 | 17 | 34 | 6 |
| | | Electrically conductive carbon black (C) | Kind | CB1 | CB1 | CB2 | CB1 | CB1 | CB1 |
| | | | Parts | 8 | 12 | 24 | 10 | 10 | 10 |
| | | Olefin-based elastomer | Kind | EO1 | EO1 | — | EO1 | EO1 | EO1 |
| | | | Parts | 3 | 3 | 0 | 3 | 3 | 3 |
| | Core layer | Polypropylene-based resin | Kind | PP2 | PP2 | PP2 | PP2 | PP2 | PP2 |
| | Outer layer/core layer weight ratio | | — | 10/90 | 10/90 | 10/90 | 10/91 | 10/90 | 10/90 |
| | Surface resistivity (10% RH) | | Ω | $9.4 \times 10^1$ | $1.3 \times 10^2$ | $1.3 \times 10^2$ | $1.4 \times 10^2$ | $1.3 \times 10^2$ | $9.5 \times 10^1$ |
| Expanded beads | Expansion conditions | Blowing agent | — | $CO_2$ | $CO_2$ | $CO_2$ | $CO_2$ | $CO_2$ | $CO_2$ |
| | | Autoclave inside pressure | MPa | 4.3 | 4.3 | 3.5 | 4.3 | 3.5 | 3.5 |
| | | Foaming temperature | °C. | 143 | 143 | 147 | 143 | 147 | 147 |
| | Physical properties | Apparent density | kg/m³ | 96 | 96 | 102 | 61 | 96 | 58 |
| | | Average cell diameter | μm | 220 | 190 | 200 | 190 | 210 | 220 |
| | | Average thickness of cover layer | μm | 6.6 | 6.6 | 6.6 | 6.6 | 6.6 | 6.6 |
| | | High temperature peak calorific value | J/g | 13.1 | 13.9 | 11.7 | 13.1 | 11.7 | 11.7 |

TABLE 7

| | | | | Comparative Example | | | | | | |
|---|---|---|---|---|---|---|---|---|---|---|
| | | | | 1 | 2 | 3 | 4 | 5 | 6 | 7 |
| Resin particles | Outer layer | Polyolefin-based resin (A) | Kind | PP1 | PP1 | PP1 | PP1 | PP1 | PP1 | PP1 |
| | | | Parts | 100 | 100 | 100 | 100 | 100 | 100 | 100 |
| | | Polymeric antistatic agent (B) | Kind | — | — | — | — | — | — | — |
| | | | Parts | — | — | — | — | — | — | — |
| | | Electrically conductive carbon black (C) | Kind | CB1 | CB1 | CB2 | CB1 | CB1 | CB1 | CB1 |
| | | | Parts | 10 | 10 | 25 | 10 | 10 | 10 | 10 |
| | | Olefin-based elastomer | Kind | — | — | — | EO1 | EO1 | EO1 | EO1 |
| | | | Parts | — | — | — | 5 | 5 | 5 | 5 |
| | Core layer | Polypropylene-based resin | Kind | PP2 | PP2 | PP2 | PP2 | PP2 | PP2 | PP2 |
| | Outer layer/core layer weight ratio | | — | 5/95 | 10/90 | 10/90 | 10/90 | 10/90 | 10/90 | 10/90 |
| | Surface resistivity (10% RH) | | Ω | $9.9 \times 10^1$ | $1.2 \times 10^2$ | $9.8 \times 10^1$ | $1.5 \times 10^2$ | $1.0 \times 10^2$ | $1.0 \times 10^2$ | $1.0 \times 10^2$ |
| Expanded beads | Expansion conditions | Blowing agent | — | $CO_2$ | $CO_2$ | $CO_2$ | $CO_2$ | $CO_2$ | $CO_2$ | $CO_2$ |
| | | Autoclave inside pressure | MPa | 3.5 | 4.3 | 4.3 | 4.3 | 4.3 | 4.3 | 4.3 |
| | | Foaming temperature | °C. | 147 | 143 | 143 | 143 | 143 | 143 | 143 |
| | Physical properties | Apparent density | kg/m³ | 89 | 88 | 91 | 92 | 21 | 35 | 40 |
| | | Average cell diameter | μm | 200 | 190 | 210 | 220 | 220 | 220 | 220 |
| | | Average thickness of cover layer | μm | 3 | 7 | 7 | 7 | 3 | 4 | 6 |
| | | High temperature peak calorific value | J/g | 12.5 | 17.9 | 17.9 | 17.5 | 16.8 | 17.0 | 17.2 |

Production of Expanded Beads Molded Article

Next, the above obtained expanded beads were subjected to an in-mold molding process by steam heating to obtain expanded beads molded articles. Use was made of a mold having a mold cavity adapted for forming a flat plate having a length of 250 mm, a width of 200 mm and a thickness of 50 mm. The heating with steam was performed as follows. Steam was fed for 5 seconds for preheating in such a state that drain valves of the stationary and moveable molds were maintained in an open state (purging step). Next, while maintaining the drain valve on the stationary mold in an open state, steam was fed from the moveable mold to perform one-direction flow heating at a pressure lower by 0.04 MPa(G) than that for the full heating. Then, while maintaining the drain valve on the moveable mold in an open state, steam was fed from the stationary mold to perform reversed one-direction flow heating at a pressure lower by 0.02 MPa(G) than that for the full heating. Thereafter, while maintaining the drain valves of the stationary and moveable molds in a closed state, steam was fed from both sides of the molds to perform full heating at a molding pressure shown in Tables 8 to 10. The molding pressure was a critical pressure at which a molded article shows the best fusion-bonding property without significant shrinkage and above which the molded article shows either significant shrinkage or reduced fusion-bonding property. After completion of the heating, the pressure inside the mold cavity was released and the molded product was cooled until its surface pressure reached 0.04 MPa(G). The molded product was taken out of the mold cavity and aged in an oven at 80° C. for 12 hours, thereby obtaining the expanded beads molded article having physical properties shown in Tables 8 to 10.

TABLE 8

| | | | | Example | | | | | |
|---|---|---|---|---|---|---|---|---|---|
| | | | | 1 | 2 | 3 | 4 | 5 | 6 |
| Expanded beads molded article | Molding conditions | Inside pressure of expanded bead | MPa (G) | 0 | 0 | 0 | 0.12 | 0.12 | 0 |
| | | Molding pressure | MPa (G) | 0.22 | 0.22 | 0.22 | 0.22 | 0.22 | 0.22 |
| | Physical properties | Fusion bonding | — | good | good | good | good | good | good |
| | | Apparent density (Ad) | kg/m$^3$ | 43 | 41 | 39 | 16 | 22 | 42 |
| | | Closed cell content | % | 88 | 88 | 88 | 88 | 88 | 88 |
| | | 50% Compressive stress (Cs) | kPa | 372 | 350 | 334 | 118 | 164 | 360 |
| | | Cs/Ad ratio | kPa/(kg/m$^3$) | 8.7 | 8.6 | 8.5 | 7.3 | 7.6 | 8.6 |
| | | Bending modulus | MPa | 7.5 | 6.9 | 6.5 | 2.2 | 2.9 | 7.1 |
| | | Shrinkage | ‰ | 24 | 22 | 24 | 30 | 28 | 22 |
| | | Surface resistivity (10% RH) | Ω | $2.1 \times 10^6$ | $2.7 \times 10^6$ | $3.0 \times 10^6$ | $3.8 \times 10^8$ | $2.7 \times 10^8$ | $2.7 \times 10^5$ |
| | | Surface resistivity (50% RH) | Ω | $5.1 \times 10^6$ | $2.6 \times 10^6$ | $2.8 \times 10^6$ | $3.2 \times 10^8$ | $2.1 \times 10^8$ | $2.1 \times 10^5$ |
| | | Charge decay (10% RH) | — | good | good | good | good | good | good |
| | | Charge decay (50% RH) | — | good | good | good | good | good | good |

TABLE 9

| | | | | Example | | | | | |
|---|---|---|---|---|---|---|---|---|---|
| | | | | 7 | 8 | 9 | 10 | 11 | 12 |
| Expanded beads molded article | Molding conditions | Inside pressure of expanded bead | MPa (G) | 0 | 0 | 0 | 0 | 0 | 0 |
| | | Molding pressure | MPa (G) | 0.22 | 0.22 | 0.22 | 0.22 | 0.22 | 0.22 |
| | Physical properties | Fusion bonding | — | good | good | good | good | good | good |
| | | Apparent density (Ad) | kg/m$^3$ | 40 | 41 | 39 | 39 | 44 | 43 |
| | | Closed cell content | % | 88 | 88 | 88 | 87 | 88 | 88 |
| | | 50% Compressive stress (Cs) | kPa | 336 | 351 | 330 | 330 | 384 | 373 |
| | | Cs/Ad ratio | kPa/(kg/m$^3$) | 8.5 | 8.6 | 8.5 | 8.5 | 8.7 | 8.7 |
| | | Bending modulus | MPa | 6.5 | 6.9 | 6.4 | 6.4 | 7.8 | 7.5 |
| | | Shrinkage | ‰ | 24 | 22 | 24 | 24 | 22 | 22 |
| | | Surface resistivity (10% RH) | Ω | $1.8 \times 10^9$ | $1.1 \times 10^6$ | $1.4 \times 10^8$ | $1.3 \times 10^8$ | $6.7 \times 10^9$ | $8.8 \times 10^6$ |
| | | Surface resistivity (50% RH) | Ω | $1.6 \times 10^9$ | $1.3 \times 10^6$ | $1.5 \times 10^8$ | $1.6 \times 10^8$ | $6.3 \times 10^9$ | $9.2 \times 10^6$ |
| | | Charge decay (10% RH) | — | good | good | good | good | good | good |
| | | Charge decay (50% RH) | — | good | good | good | good | good | good |

TABLE 10

| | | | | Comparative Example | | | | | | |
|---|---|---|---|---|---|---|---|---|---|---|
| | | | | 1 | 2 | 3 | 4 | 5 | 6 | 7 |
| Expanded beads molded article | Molding conditions | Inside pressure of expanded bead | MPa (G) | 0 | 0 | 0 | 0 | 0.12 | 0.12 | 0.12 |
| | Physical properties | Molding pressure | MPa (G) | 0.26 | 0.28 | 0.26 | 0.26 | 0.24 | 0.24 | 0.22 |
| | | Fusion bonding | — | good | good | good | good | good | good | good |
| | | Apparent density (Ad) | kg/m$^3$ | 42.0 | 46.0 | 49.0 | 50.0 | 14.0 | 22.0 | 27.0 |
| | | Closed cell content | % | 88 | 87 | 88 | 87 | 88 | 88 | 88 |
| | | 50% Compressive stress (Cs) | kPa | 362 | 406 | 439 | 451 | 101 | 167 | 212 |
| | | Cs/Ad ratio | kPa/(kg/m$^3$) | 8.6 | 8.8 | 9.0 | 9.0 | 7.2 | 7.6 | 7.9 |
| | | Bending modulus | MPa | 7.2 | 7.9 | 8.6 | 8.9 | 2.3 | 3.4 | 4.4 |
| | | Shrinkage | ‰ | 22 | 20 | 20 | 20 | 30 | 28 | 26 |
| | | Surface resistivity (10% RH) | Ω | $6.4 \times 10^3$ | $3.8 \times 10^3$ | $2.9 \times 10^2$ | $2.9 \times 10^3$ | $1.0 \times 10^{15} <$ | $1.0 \times 10^{15} <$ | $8.3 \times 10^3$ |
| | | Surface resistivity (50% RH) | Ω | $5.8 \times 10^3$ | $3.7 \times 10^3$ | $2.8 \times 10^2$ | $2.7 \times 10^3$ | $1.0 \times 10^{15} <$ | $1.0 \times 10^{15} <$ | $9.5 \times 10^3$ |
| | | Charge decay (10% RH) | — | good | good | good | good | good | good | good |
| | | Charge decay (50% RH) | — | good | good | good | good | good | good | good |

The physical properties of the expanded beads and expanded beads molded articles shown in Tables 8 to 10 were measured as follows.

Surface Resistivity:

The surface resistivity of the molded article was measured under two different Conditions (1) and (2). In the case of Condition (1), the molded article test piece was aged at 23° C. and a relative humidity of 10% RH for 1 day and thereafter measured for its surface resistivity according to JIS C2170 (2004) at 23° C. and a relative humidity of 10% RH. In the case of Condition (2), the molded article test piece was aged at 23° C. and a relative humidity of 50% RH for 1 day and thereafter measured for its surface resistivity according to JIS C2170 (2004) at 23° C. and a relative humidity of 50% RH. The molded article test piece having a length of 100 mm, a width of 100 mm and a thickness equal to that of the molded article was cut out from the molded article. The surface resistivity was measured on the skin surface (rather than the cut surface) of the test piece using resistivity meter (HIRESTA MCP-HT450, manufactured by Mitsubishi Chemical Analytech Co., Ltd.). When the measured value was less than $1\times10^4 S2$, surface resistivity was again measured on the skin surface using resistivity meter (LORESTA MCP-HT610, manufactured by Mitsubishi Chemical Analytech Co., Ltd.).

The surface resistivity of the resin particles was also measured. The resin particles were heat-pressed at 200° C. to form a test piece having a length of 100 mm, a width of 100 mm and a thickness of 2 mm. The test piece was aged at 23° C. and a relative humidity of 50% RH for 1 day and thereafter measured for its surface resistivity in the same manner as above according to JIS C2170 (2004) at 23° C. and a relative humidity of 50% RH. The results are also shown in Tables 8 to 10.

Charge Decay:

The charge decay time of the molded article was measured under two different Conditions (1) and (2). In the case of Condition (1), the molded article test piece was aged at 23° C. and a relative humidity of 10% RH for 1 day and thereafter measured for its charge decay time at 23° C. and a relative humidity of 10% RH. In the case of Condition (2), the molded article test piece was aged at 23° C. and a relative humidity of 50% RH for 1 day and thereafter measured for its surface resistivity at 23° C. and a relative humidity of 50% RH. The molded article test piece having a length of 150 mm, a width of 150 mm and a thickness of 10 mm was cut out from the molded article such that one of the surfaces with 150×150 mm area was the skin surface of the molded article. The charge decay was measured using a measuring device (Charged Plate Monitor Model 159HH, manufactured by Trek Japan Co., Ltd.). Thus, the test piece was placed on a measurement plate of the device and charged with a voltage of 1,300V. Thereafter, a center part of the test piece on the side opposite from the measurement plate was grounded using a copper wire. The time required for the voltage to decay from 1,000V to 100V was measured. When the decay time was 2 seconds or shorter, the charge decay was evaluated as being good. Otherwise, the charge decay was evaluated as being no good.

Fusion Bonding:

Fusion bonding was evaluated as follows. The molded article was bent and ruptured. The ruptured cross section was observed to count a number (C1) of the expanded beads present on the surface and a number (C2) of the expanded beads which underwent material failure. The percentage (C2/C1×100) of (C2) based on (C1) was calculated. The above procedure was repeated five times in total. The arithmetic mean of the five calculated values represents the degree of fusion bonding (n=5). When the fusion bonding degree was 80% or higher, the fusion bonding was evaluated as being good. Otherwise, the fusion bonding was evaluated as being no good.

Apparent Density of Expanded Beads:

A group of expanded beads (weight: W (g), volume: about 500 $cm^3$), which had been allowed to stand at 23° C., a relative humidity of 50% under 1 atm for 2 days, were immersed in water contained in a graduation cylinder using a wire net. From the rise of the water level in the graduation cylinder, a volume (V ($cm^3$)) of the group of the expanded beads was measured. The apparent density ($kg/m^3$) of the expanded beads was determined by dividing the weight of the group of the expanded beads by the volume thereof (W/V), followed by unit conversion.

Average Cell Diameter of Expanded Beads:

The average cell diameter of the expanded beads was measured by the method described previously. The arithmetic mean of the ten calculated values represents the average cell diameter of the expanded beads (n=10).

Average Thickness of Cover Layer of Expanded Beads:

The average thickness of the cover layer of expanded beads was determined by the method described previously. The expanded beads were regarded as having a circular columnar shape. The arithmetic mean of the one hundred calculated values represents the average thickness of the cover layer of the expanded beads (n=100).

High Temperature Peak Calorific Value of Expanded Beads:

From the obtained expanded beads, 10 of them were sampled at random. Each expanded bead was subjected to DSC measurement from which the calorific value of the high temperature peak was determined. The arithmetic mean of the ten calculated values represents the high temperature peak calorific value of the expanded beads (n=10).

Apparent Density of Expanded Beads Molded Article:

The apparent density ($kg/m^3$) of the expanded beads molded article was calculated by dividing the weight of thereof by the volume thereof that was determined from the outer dimension thereof.

50% Compressive Stress:

According to JIS K6767 (1999), 50% compression stress of the expanded beads molded article was measured.

Closed Cell Content:

Three test pieces were cut out at random from the expanded beads molded article. Each test piece was measured for the closed cell content by the method described previously. The arithmetic mean of the three calculated values represents the closed cell content of the molded article (n=3).

Shrinkage:

The obtained expanded beads molded article was aged at 80° C. for 12 hours and, thereafter, measured for its length L2 (mm). The shrinkage (‰) of the molded article was then calculated from the formula (L1−L2)×1000/L1, where L1 is 250 mm (dimension of the molded cavity). Similar measurement was carried out for 3 molded articles obtained by the same method. The arithmetic mean of the three calculated values represents the shrinkage of the expanded beads molded article (n=3).

Bending Modulus:

The skin surfaces of the expanded beads molded article were removed to obtain a test piece having a thickness of 5 mm. The test piece was measured for the bending modulus according to JIS K7221-1(2006). Similar measurement was carried out for 5 molded articles obtained by the same method. The arithmetic mean of the five calculated values represents the bending modulus of the expanded beads molded article (n=5).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein. The teachings of Japanese Patent Application No. 2012-225005, filed Oct. 10, 2012, inclusive of the specification, claims and drawings, are hereby incorporated by reference herein.

What is claimed is:

1. A polyolefin-based resin expanded beads molded article obtained by in-mold molding of multi-layered polyolefin-based resin expanded beads each having an polyolefin-based resin expanded core layer and a polyolefin-based resin cover layer covering the polyolefin-based resin expanded core layer,
   wherein the polyolefin-based resin cover layer comprises a mixture of a polyolefin-based resin (A), a polymeric antistatic agent (B) which is a block copolymer of a polyether block and a polyolefin block, and an electrically conductive carbon black (C),
   wherein a weight ratio (A:B) of the polyolefin-based resin (A) to the polymeric antistatic agent (B) is 99.5:0.5 to 55:45, and the electrically conductive carbon black (C) is present in an amount of 5 to 30 parts by weight per 100 parts by weight of the total of the polyolefin-based resin (A) and the polymeric antistatic agent (B),
   wherein the cover layer has a structure in which the polyolefin-based resin (A) forms a continuous phase and the polymeric antistatic agent (B) forms dispersed phases that are dispersed in the continuous phase with the electrically conductive carbon black (C) being unevenly distributed to the dispersed phases, and
   wherein the polyolefin-based resin expanded beads molded article has a surface resistivity of $1\times10^5$ to $1\times10^{10}\Omega$.

2. The polyolefin-based resin expanded beads molded article according to claim 1, wherein both of the polyolefin-based resin of the polyolefin-based resin expanded core layer and the polyolefin-based resin of the polyolefin-based resin cover layer are a polypropylene-based resin.

3. The polyolefin-based resin expanded beads molded article according to claim 1, wherein the electrically conductive carbon black (C) is Ketjen black and present in an amount of 5 to 15 parts by weight per 100 parts by weight of the total of the polyolefin-based resin (A) and the polymeric antistatic agent (B).

4. The polyolefin-based resin expanded beads molded article according to claim 1, wherein a weight ratio of the polyolefin-based resin expanded core layer to the polyolefin-based resin cover layer is 99.5:0.5 to 65:35.

5. The polyolefin-based resin expanded beads molded article according to claim 1, wherein the polyolefin-based resin expanded beads molded article has an apparent density of 10 to 90 kg/m$^3$.

6. The polyolefin-based resin expanded beads molded article according to claim 1, wherein the polyolefin-based resin expanded beads molded article has a 50% compressive stress of Cs [kPa] and an apparent density of Ad [kg/m$^3$] and, wherein a ratio Cs/Ad is 6 or higher.

* * * * *